Jan. 21, 1958 J. J. A. GRABAU ET AL 2,820,950
FOUR TERMINAL EQUALISER NETWORKS
Filed Sept. 30, 1954 2 Sheets-Sheet 1
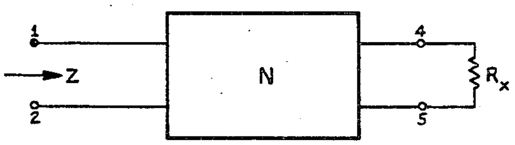
Fig. 1
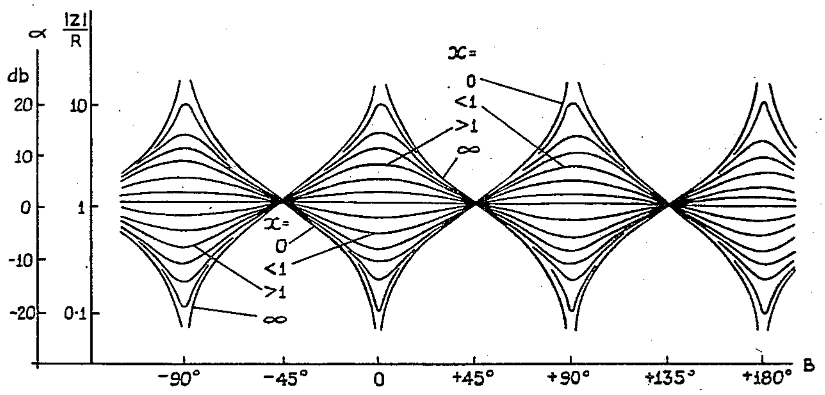
Fig. 2
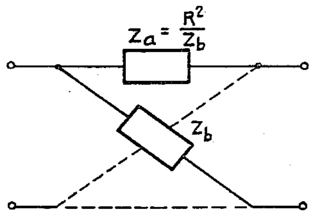
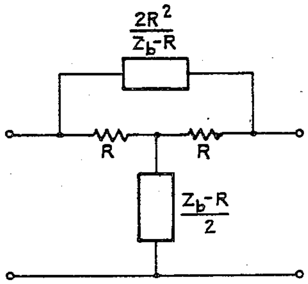
Fig. 3 Fig. 4
Inventors
JOACHIM JUSTUS ANDREAS GRABAU.
& WOLJA SARAGA.
By
Young, Emery & Thompson
Attorneys Inventors
JOACHIM JUSTUS ANDREAS GRABAU
& WOLJA SARAGA.
By
Young, Emery & Thompson
Attorneys United States Patent Office
2,820,950
Patented Jan. 21, 1958

2,820,950

FOUR TERMINAL EQUALISER NETWORKS

Joachim Justus Andreas Grabau, Liverpool, and Wolja Saraga, Orpington, England, assignors to Automatic Telephone & Electrical Company Limited, Liverpool, England, a British company Application September 30, 1954, Serial No. 459,306

Claims priority, application Great Britain October 22, 1953

5 Claims. (Cl. 333—28)

The present invention relates to four-terminal equaliser networks whose driving point impedance varies with frequency. More particularly the invention is concerned with four-terminal networks consisting of lumped resistors, capacitors and inductors, and whose primary driving point impedance varies in a stipulated manner both with frequency and with the impedance connected to the secondary terminals.

A special application for networks of this general type is the variable slope equaliser frequently employed in carrier transmission system equipped with automatic gain control. In such a system, the transmission characteristics of an open-wire line are equalised in two stages, the functions of the two parts of the gain control equipment being respectively to provide for an adjustment of gain which is equal at all frequencies in the transmitted band, and to provide for an adjustment of gain which is a linear function of frequency within the transmission band. The characteristics of a network designed in accordance with this latter requirement must also include a "hinge" frequency which may be within, outside, or at one end of the transmitted band, i. e. a frequency at which the modulus of the driving point impedance remains constant when the slope of the gain/frequency characteristic is varied.

It is the object of the invention to provide a simple network of which the logarithm of the modulus of its driving point impedance is a substantially linear function of frequency in a limited frequency interval, the function being variable with change of the terminating impedance, while at a given frequency within the interval the modulus is constant and does not vary with change of terminating impedance.

According to another feature of the invention, in a symmetrical four-terminal network having an image impedance which is constant and real for all frequencies within a limited frequency range and which when terminated by a resistor has a driving point impedance the logarithm of whose modulus varies with frequency over said limited frequency range as a substantially linear function the slope of which varies with the value of the terminating resistor, the components are so selected as to make the image phase shift equal to one of the values 45 deg.$\pm n90$ deg., $n$ being a positive integer at that frequency within said range of frequencies at which the driving point impedance is desired to be maintained constant and independent of the terminating resistor.

The nature of the invention will be understood from the following description, which should be read in conjunction with the accompanying drawings comprising Figs. 1–9.

Figure 5:
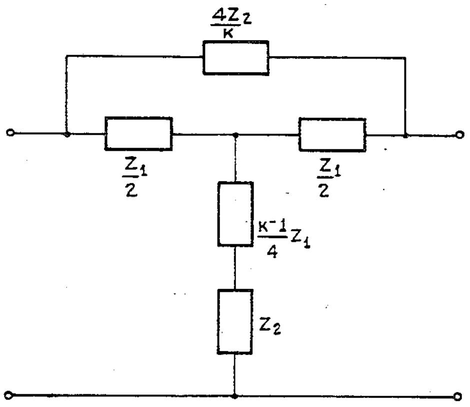
Figure 6:
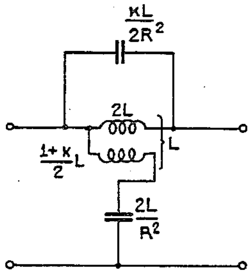
Figure 7:
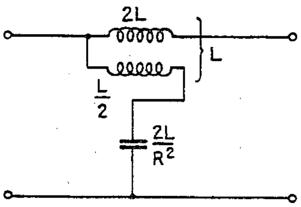
Figure 9:
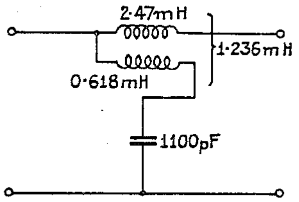
Figure 8:
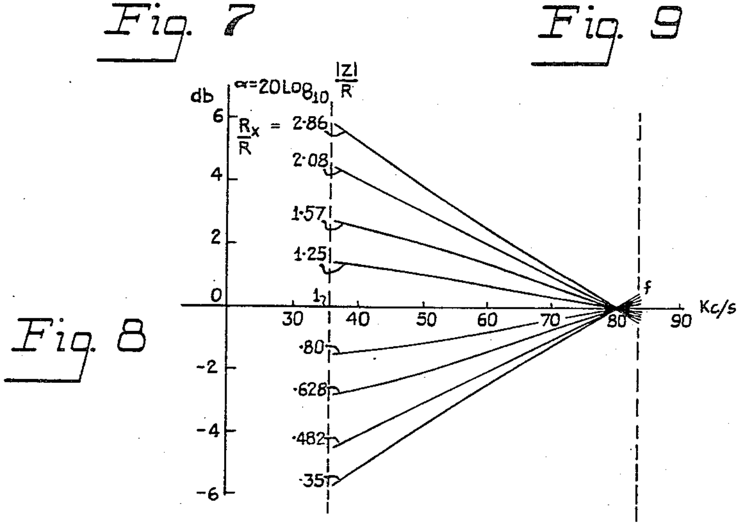

Of these,

Fig. 1 shows the arrangement of the network of the invention and its connection to its terminating impedance, Fig. 2 shows the modulus of the driving point impedance of the network of the invention drawn as a function of the phase-shift and of the terminating impedance, Fig. 3 shows the general form of a constant resistance balanced lattice network, Figs. 4 and 5 show networks which are equivalent under certain conditions to that shown in Fig. 3, Figs. 6 and 7 show networks derived from that of Fig. 5 after assigning special values to its elements, Fig. 8 shows the performance diagram of a particular network illustrating the invention and Fig. 9 shows the component values of this network.

A linear relation between the logarithm of the driving point impedance of the network and frequency can be expressed as:

$$\log |Z| = a + b(f - f_h)$$

where $Z$ denotes the modulus of the primary driving point impedance $|Z|$ of the network, which can be considered as being terminated by a purely resistive impedance $R_x$, $f$ is frequency, $f_h$ is the "hinge" frequency at which $Z$ is to be constant, $b$ is a factor depending on and varying with the terminating resistance $R_x$, and $a$ is a constant.

While no physical network exists whose driving-point impedance varies accurately in accordance with the above equation, it can be shown that good approximations can be obtained for limited frequency intervals. The general arrangement of the network N in relation to its terminating resistor is shown in Fig. 1, from which it will be seen that its driving-point impedance is measured at terminals 1 and 2, while the terminating resistor $R_x$ is connected to terminals 3 and 4.

In the following description it is assumed that the fundamental principles of four-terminal network analysis are understood, and reference should, where necessary, be made to the standard textbooks dealing with this subject, e. g. "Electrical Circuits and Wave Filters" by A. T. Starr: Sir Isaac Pitman & Sons Ltd., 1940.

The driving-point impedance $Z$ of a symmetrical four-terminal network, having an image impedance $Z_I$, an image transfer constant $$\theta = A + jB$$

where A is the image attenuation and B is the image phase shift, and terminated by a resistance $R_x$, may be written as:

$$Z = Z_I \frac{\frac{R_x}{Z_I} + \tanh\theta}{1 + \frac{R_x}{Z_I} \cdot \tanh\theta}$$

The argument will now be further restricted to such networks whose image impedance is substantially constant and real, at least for all frequencies within the range of interest, so that $Z_I$ can now be considered as approximating to a resistive value R over a limited range of frequencies.

The last equation can now be written:

$$\frac{Z}{R} = \frac{\frac{R_x}{R} + \tanh\theta}{1 + \frac{R_x}{R} \cdot \tanh\theta}$$

with the modulus:

$$\frac{|Z|}{R} = \sqrt{\frac{\left(\frac{R_x}{R}\right)^2 + \tan^2 B}{1 + \frac{R_x}{R}^2 \tan^2 B}}$$

provided $A=0$, and in the general case where $A\neq 0$, $$\frac{|Z|}{R}=\sqrt{\frac{x^2+\tan^2 B}{1+x^2\tan^2 B}}$$

where $$x=\frac{\frac{R_x}{R}+\tanh A}{1+\frac{R_x}{R}\cdot\tanh A}$$

A diagram of $$\alpha=20\log_{10}\frac{|Z|}{R}$$

as a function of the image phase-shift B, illustrating the above modulus relations, is shown in Fig. 2. It will be seen that for the values of phase-shift $B=\pm 45°$, $\pm 135°$, and so on, $\alpha=0$ and is independent of $x$, while in the intermediate intervals $\alpha$ is a steadily increasing or decreasing function of $x$ for a fixed value of B.

The case $A=0$ is represented by purely reactive networks which have phase-shift values which increase monotonously with frequency. In other words, the phase-shift variable B in Fig. 2 may be regarded as a distorted frequency scale. In any particular network the relation between B and $f$ will be fixed and with a suitable choice of network it will frequently be possible to establish the required linear relation between $|Z|$ and $f$, especially if the network exhibits phase shift values which are different from $B=0°$, $\pm 90°$, $\pm 180°$ and so on, in the frequency range of interest.

By including suitable resistive elements in the network, thereby making $A\neq 0$, it is possible to select ranges for which the general character of the $\alpha/\beta$ curves is not much different from that shown in Fig. 2. The additional parameters made available in this way can be used to assist in linearising the characteristics.

Numerous networks can be found for which the relation between $\alpha$ and B is of such a nature as to permit the realisation of linear characteristics for $\alpha(f)$ according to the invention. Of special interest, however, are symmetrical networks having an image impedance R which is constant and real for all frequencies. These networks can be realised as balanced lattices of the type shown in Fig. 3. These have series and diagonal arms, the product of whose impedances $Z_a$ and $Z_b$ is equal to the square of R. Equivalent to this lattice is the balanced or unbalanced bridged-T circuit, of which the unbalanced type is shown in Fig. 4. It will be obvious that this circuit can only be used as long as the resistive part of $Z_b$ is greater than or equal to R.

Other equivalent networks can be found provided $Z_b$ can be split up into two impedances connected in series according to the equation:

$$Z_b=\frac{k}{2}Z_1+2Z_2$$

where $$Z_1Z_2=R^2$$

One of the networks obtained in this way is shown in Fig. 5. If it turns out that $Z_b$ permits representation as a series combination of an inductance:

$$kL=\frac{kZ_1}{2_p}$$

(where $p=\sqrt{-1}.2\pi f$)

and a capacitance:

$$C=\frac{1}{2Z_2p}$$

such that $k$ is not negative but is less than one, then the star-combination of $$\frac{Z_1}{2},\ \frac{Z_1}{2},\ \frac{k-1}{4}$$

$Z_1$ in Fig. 5, can be replaced by a transformer coil as shown in Fig. 6.

A further simplification arises in the case where $k=0$, when the circuit is reduced to a coupled coil without leakage flux and one capacitor, as shown in Fig. 7.

The relation between the image transfer constant $\phi$ and the impedance $Z_b$ of the diagonal arm of the balanced lattice network is given by the equation:

$$\theta=A+jB=2\coth^{-1}\frac{Z_b}{R}$$

which reduces for a purely reactive impedance $Z_b$ to:

$$B=-2\cot^{-1}\frac{Z_b}{jR}$$

In the general case $Z_b$ can be expressed as:

$$Z_b=r+js$$

with $r$ and $s$ real, and $r\geqq 0$.

The condition for the presence of a hinge frequency $f_h$ may be stated as follows:

$$\pm 1=\tan B_h$$
$$=\tan\left[\text{imaginary part of:}\ 2\coth^{-1}\frac{(r_h+js_h)}{R}\right]$$
$$=\frac{2s_hR}{R^2-r_h^2-s_h^2}$$

The suffix $h$ indicates that the values are taken at the frequency $f=f_h$.

In order for this last expression to lead to a real value for $s_h$, the condition $$r_h^2\leqq 2R^1$$

must be satisfied. If, furthermore, the network should be capable of being transformed into the bridged-T type shown in Fig. 5, the restriction of $r$ assumes the form:

$$R\leqq r_h\leqq\sqrt{2}.R$$

Frequently the network is part of a circuit whose unavoidable stray capacitances add an undesirable capacitive shunt to one or both pairs of the terminals, and the result may be the disappearance of a sharply defined hinge frequency. In this case it will generally be possible to neutralise the capacitive effect by connecting a suitable inductor across the terminals which, at the hinge frequency, resonates with the stray capacitance measured at that point.

The design of a specific network will now be described by way of example, the resulting network being of the kind shown in Fig. 7. The problem for consideration is the provision of a network whose characteristics $$\alpha=20\log_{10}\frac{|Z|}{R}$$

vary substantially linearly according to the equation:

$$\log|Z|=a+b(f-f_h)$$

in the frequency interval 36–84 kc./s. The hinge frequency is required to be 80 kc./s., and at 36 kc./s. the quantity $\alpha$ should vary monotonously from −6 db to +6 db while $$\frac{Rx}{R}$$

increases from $\not<$0.2 to $\not>$5.

A glance at Fig. 2 shows that under the stated conditions the phase shift B at the frequency $f_h$ could be, amongst other values, 45°. Assuming the network to be purely reactive it will be seen from the foregoing that, at the hinge frequency:

$$\left[f=\frac{Z_b}{f_h}\right]=-jR\cot\frac{B}{2}$$
$$=-j2.414R$$

It can be shown that the phase-shift at 36 kc./s. should vary from 24.5° downwards, the optimum value being obtained by trial and error so as to produce the best linearity of the characteristics. It happens in this particular example that the optimum condition is very close to that which allows the realisation of the network shown in Fig. 7. The equation for this network, derived from those set out in connection with Figs. 5 and 6, can be written:

$$Z_b=\frac{1}{C_p}=\frac{R^2}{L_p}$$

The phase shift B at 36 kc./s. is then:

$$\left[f=\frac{B}{36\text{ kc./s.}}\right]=2\cot^{-1}\frac{80}{36}\cdot 2.414$$
$$=21.1°$$

which is in fact, lower than 24.5°.

After obtaining the value of C from the relation:

$$RC=\frac{R}{Z_b p}=\frac{1}{2\pi f_k\cdot 2.414}$$
$$=0.825\Omega\cdot\mu F$$

the characteristics $(f)$ may be obtained from the equation for Fig. 2 after calculating B from:

$$B=-2\cot^{-1}\frac{Z_b}{jR}$$
$$=2\tan^{-1}(2\pi f\,RC)$$

The diagram of $\alpha(f)$ with $$\frac{Rx}{R}$$

as a parameter is shown in Fig. 8 with $L=R^2C$ and $R=1500\Omega$ the elemental values of the network are as shown in Fig. 9.

We claim:

1. A four-terminal network having an image impedance which is constant and real for all frequencies within a limited frequency range and which when terminated by a resistor has a driving point impedance the logarithm of whose modulus varies with frequency over said limited range as a substantially linear function, the slope of which varies with the value of the terminating resistor, the network being formed of components which make the image phase shift equal to one of the values 45 deg. $\pm n$ 90 deg., $n$ being a positive integer, at a frequency within said limited frequency range at which the driving point impedance is desired to be maintained constant and independent of the terminating resistor.

2. A four-terminal symmetrical network as claimed in claim 1 and comprising a balanced lattice network having series and diagonal impedances whose product equals the square of the image impedance, the series and diagonal impedances being two terminal networks.

3. A four-terminal network as claimed in claim 1 and comprising series and shunt arms, a two winding inductive coil having total impedance L, the first winding being connected in the series arm and having impedance 2L while the second winding is connected in the shunt arm and has impedance $$\frac{1+K}{2}\cdot L$$

where K has a value between 0 and 1, a first capacitor connected in shunt of said first winding and having impedance $$\frac{KL}{2R^2}$$

where R is the image impedance of the network and a second capacitor connected in series with said second winding and having impedance $$\frac{2L}{R^2}$$

4. A four-terminal network as claimed in claim 1 and comprising series and shunt arms, a two-winding inductive coil having total impedance L, one winding of said coil being connected in the series arm and having an impedance 2L while the other winding is connected in the shunt arm and has an impedance $$\frac{L}{2}$$

and a capacitor in series with said second winding and having an impedance $$\frac{2L}{R^2}$$

where R is the image impedance of the network.

5. A four-terminal network as claimed in claim 1 and comprising an inductor connected across at least one pair of terminals of the network to compensate the inherent capacity effects, the inductor resonating with said inherent capacity at the frequency at which the driving point impedance is desired to be maintained constant and independent of the terminating resistance.

References Cited in the file of this patent

UNITED STATES PATENTS

| | | |
|---|---|---|
| 1,970,933 | Frederick | Aug. 21, 1934 |
| 1,991,195 | Darlington | Feb. 12, 1935 |
| 2,035,258 | Bode | Mar. 24, 1936 |
| 2,694,184 | Rounds | Nov. 9, 1954 |
| 2,698,420 | Saraga | Dec. 28, 1954 |
| 2,758,281 | Carleson | Aug. 7, 1956 |

UNITED STATES PATENT OFFICE

CERTIFICATE OF CORRECTION

Patent No. 2,820,950 January 21, 1958

Joachim Justus Andreas Grabau et al.

It is hereby certified that error appears in the above numbered patent requiring correction and that the said Letters Patent should read as corrected below.

In the grant, lines 2 and 3, and line 13, and in the heading to the printed specification, lines 4 and 5, name of assignee, for "Automatic Telephone & Electrical Company Limited" read -- Automatic Telephone & Electric Company Limited --.

Signed and sealed this 22nd day of April 1958.

(SEAL)
Attest:

KARL H. AXLINE
Attesting Officer

ROBERT C. WATSON
Commissioner of Patents